US012101700B2

(12) United States Patent
Feng (10) Patent No.: US 12,101,700 B2
(45) Date of Patent: Sep. 24, 2024

(54) INTERNET OF VEHICLES MESSAGE NOTIFICATION METHOD AND APPARATUS

(71) Applicant: HUAWEI TECHNOLOGIES CO., LTD., Guangdong (CN)

(72) Inventor: Jiangping Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 748 days.

(21) Appl. No.: 17/320,699

(22) Filed: May 14, 2021

(65) Prior Publication Data

US 2021/0274328 A1 Sep. 2, 2021

Related U.S. Application Data

(63) Continuation of application No. PCT/CN2019/117818, filed on Nov. 13, 2019.

(30) Foreign Application Priority Data

Nov. 18, 2018 (CN) .......................... 201811371114.1

(51) Int. Cl.
*H04W 4/40* (2018.01)
*G08G 1/09* (2006.01)
(Continued)

(52) U.S. Cl.
CPC .............. *H04W 4/40* (2018.02); *G08G 1/091* (2013.01); *H04L 67/51* (2022.05); *H04W 48/16* (2013.01); *H04L 67/12* (2013.01); *H04W 88/16* (2013.01)

(58) Field of Classification Search
CPC ........... H04W 4/40; H04W 4/42; H04W 4/44; H04W 4/46; H04W 4/48; H04L 51/06;
(Continued)

(56) References Cited

U.S. PATENT DOCUMENTS 10,110,495 B1 10/2018 Sabella et al.
2012/0297088 A1* 11/2012 Wang ...................... H04L 45/32
709/238

(Continued)

FOREIGN PATENT DOCUMENTS

CN 107295699 A 10/2017
CN 108322488 A 7/2018
(Continued)

OTHER PUBLICATIONS

Office Action issued in JP2021-526774, dated Jun. 21, 2022 with English translation, 11 pages.
(Continued)

*Primary Examiner* — Robert C Scheibel (57) ABSTRACT

This application provides an internet of vehicles message notification method, applied to a multi-access edge computing system including a first application instance, a second application instance and an internetworking service instance. The method includes: receiving, by the first application instance, a notification message; sending, by the first application instance, the notification message to the interworking service instance; sending, by the interworking service instance, the notification message to the second application instance that subscribes to the message; and sending, by the second application instance, the notification message to an in-vehicle application served by the second application instance. As a result, data can be exchanged and shared between vehicles of different vehicle manufacturers and between internet of vehicles application instances of different vehicle manufacturers. Therefore, a real internet of vehicles service is implemented.

13 Claims, 5 Drawing Sheets

(51) Int. Cl.
*H04L 67/12* (2022.01)
*H04L 67/51* (2022.01)
*H04W 48/16* (2009.01)
*H04W 88/16* (2009.01)

(58) Field of Classification Search
CPC .......... H04L 51/066; G08G 1/00; G08G 1/09; G08G 1/091
See application file for complete search history.

(56) References Cited

U.S. PATENT DOCUMENTS

| | | | |
|---|---|---|---|
| 2018/0183855 A1 | 6/2018 | Sabella et al. | |
| 2018/0332524 A1 | 11/2018 | Rasanen et al. | |
| 2019/0273624 A1* | 9/2019 | Hoffmann | H04W 4/24 |
| 2020/0267518 A1* | 8/2020 | Sabella | H04L 67/12 |
| 2020/0296187 A1* | 9/2020 | Sabella | H04L 67/12 |
| 2021/0176769 A1* | 6/2021 | Chou | H04W 72/542 |

FOREIGN PATENT DOCUMENTS

| | | | |
|---|---|---|---|
| JP | 2008311701 A | 12/2008 | |
| WO | 2017176329 A1 | 10/2017 | |

OTHER PUBLICATIONS

Lu Hou et al., "Design on Publish/Subscribe Message Dissemination for Vehicular Networks with Mobile Edge Computing", 2017 IEEE, total 6 pages.

Huawei et al., "Discussion on supporting MEC with CAPIF", 3GPP TSG-SA WG6 Meeting #25 S6-181078,S ophia Antipolis, France, Jul. 23-27, 2018, total 10 pages.

Extended European Search Report issued in EP19884596.8, dated Nov. 23, 2021, 9 pages.

S6-181079 Huawei, Hisilicon, "Supporting MEC with CAPIF", 3GPP TSG-SA WG6 Meeting #25, Sophia Antipolis, France, Jul. 23-27, 2018, total 4 pages.

ETSI GR MEC 022 V2.1.1 (Sep. 2018), "Multi-access Edge Computing(MEC); Study on MEC Support for V2X Use Cases",Total 19 Pages.

ETSI GS MEC 001 V1.1.1 (Mar. 2016),"Mobile Edge Computing (MEC) Terminology", Total 7 Pages.

ETSI GS MEC 003 V1.1.1 (Mar. 2016), "Mobile Edge Computing (MEC); Framework and Reference Architecture", Total 18 Pages.

Office Action issued in CN201811371114.1, dated Sep. 17, 2020, Total 8 Pages.

International Search Report and Written Opinion issued in PCT/CN2019/117818, dated Feb. 20, 2020, Total 9 Pages.

* cited by examiner

INTERNET OF VEHICLES MESSAGE NOTIFICATION METHOD AND APPARATUS

CROSS-REFERENCE TO RELATED APPLICATIONS

This application is a continuation of International Application No. PCT/CN2019/117818, filed on Nov. 13, 2019, which claims priority to Chinese Patent Application No. 201811371114.1, filed on Nov. 18, 2018. The disclosures of the aforementioned applications are hereby incorporated by reference in their entireties.

TECHNICAL FIELD

The present invention relates to the communications field, and in particular, to an internet of vehicles message notification method and an apparatus.

BACKGROUND

Multi-access edge computing (MEC) provides a cloud computing-based capability for a mobile user at an edge of an operator network that is close to the user, so that the user can deploy an application at the edge of the network by using the capability. Multi-access edge computing can also provide real-time network information (such as a user location and base station load), so that the user can develop differentiated applications by using the information. After the cloud computing capability is deployed at the edge of the network, a carrier-class service environment that ensures high performance, a low latency, and a high bandwidth can be created, to accelerate delivery and downloading of content, services, and applications in the network. Then, a consumer can enjoy network experience with higher quality.

An ultra-low latency service is very sensitive to latency, but both transmission path(s) and forwarding node(s) may increase the latency. Multi-access edge computing enables contents and services to be deployed close to the user while the transmission path is short and forwarding nodes are few. Therefore, multi-access edge computing is necessary for implementing ultra-low latency services. Typical scenarios include internet of vehicles, industrial control, telemedicine, virtual reality/augmented reality, and the like.

Figure 1:
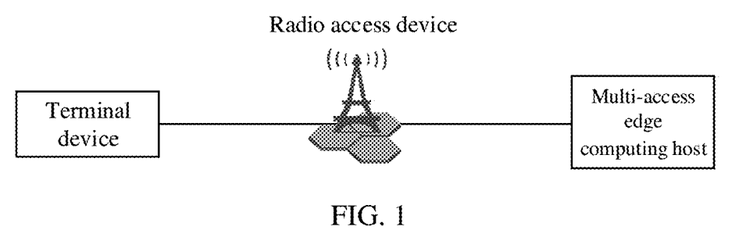
FIG. 1 is a schematic diagram of a multi-access edge computing host deployed in proximity in the prior art.

For an ultra-high bandwidth service, multi-access edge computing (such as a multi-access edge computing host shown in FIG. 1) is deployed in proximity, to process ultra-high bandwidth traffic in proximity. This can greatly alleviate impact exerted by the high bandwidth on a backbone network. Typical scenarios include live broadcast of a match in a stadium, live broadcast of a concert, mobile content delivery, and the like.

The European Telecommunications Standards Institute (ETSI) defines a reference architecture of multi-access edge computing in ETSI GS MEC 003. The architecture consists of two parts: a multi-access edge computing (such as the multi-access edge computing host shown in FIG. 1) is deployed in proximity, to process an ultra-high bandwidth service in proximity and a multi-access edge computing management system. The MEC host includes a MEC platform, a virtualization infrastructure, and a MEC application. The virtualization infrastructure provides virtualized computing, storage, and network resources for the MEC application. The MEC application is deployed on the MEC host in a form of a virtual machine or a container. The MEC platform mainly has a service registry and discovery function and provides some public services, such as DNS servers or DNS proxy services. The multi-access edge computing management system includes a MEC orchestrator, a MEC platform manager, and a virtualization infrastructure manager. The MEC orchestrator maintains an overall view of a MEC system including all multi-access edge computing hosts, available resources, and available MEC services, and triggers application instantiation and termination. The MEC platform manager is configured to manage the MEC platform, a life cycle of a mobile MEC application, and a flow rule and a DNS rule of the application. The virtualization infrastructure manager manages a virtualized resource required by the MEC application.

A MEC application such as an internet of vehicles application, an internet of things application, or a video buffering application, can have a plurality of copies that serve as application instances. The application instances are deployed on different multi-access edge computing hosts. Terminal devices, such as an intelligent vehicle, an internet of things device, and a mobile phone, access the application instances in proximity through an access network of a telecommunications operator. Some applications can provide some capabilities for another application. A capability provider is referred to as a service, and the service may have a plurality of instances.

In conventional end-to-end mobile communication, processing has to be performed by a radio access network, a core network, a platform, and an application. Consequently, an end-to-end latency is relatively long, and the performance cannot meet a requirement of a V2X application with a high latency requirement. MEC moves data, applications, and intelligence to an edge of a base station. The number of routing nodes needed for data transmission are reduced and services are deployed on an edge node, to reduce an end-to-end communication latency. In addition, MEC as a local service hosting environment, can support deployment of local internet of things services with more geographical and regional characteristics and higher throughput, such as an intelligent parking guidance service and an intelligent traffic light service at an urban intersection.

A vehicle manufacturing enterprise (hereinafter referred to as "vehicle manufacturer") signs a contract with a telecommunications operator. An in-vehicle application exchanges information with an internet of vehicles application instance deployed on an edge cloud through a network provided by the telecommunications operator. For example, when a vehicle detects that a road is frozen or wet, the vehicle reports alarm information. After receiving the alarm information, the internet of vehicles application instance on the edge cloud processes the alarm information and sends the processed alarm information to another vehicle in the same location area to prevent an accident.

Currently, the foregoing information can be exchanged only between a vehicle and an internet of vehicles application instance that are of a same vehicle manufacturer and a same telecommunications operator. Applications of another vehicle manufacturer, including applications deployed on a same edge cloud and different edge clouds, cannot receive the information. Vehicles of different vehicle manufacturers and a same operator or vehicles of different operators and a same vehicle manufacturer or different vehicle manufacturers cannot share information. Road environment information of different vehicle manufacturers and a same telecommunications operator, vehicles of different telecommunications operators and a same vehicle manufacturer, or vehicles of different vehicle manufacturers cannot be shared. Consequently, a real internet of vehicles service cannot be implemented.

SUMMARY

Embodiments of the present invention provide an internet of vehicles message notification method, an apparatus, and a system, to resolve an existing problem that vehicles of different vehicle manufacturers cannot share road environment information or cannot coordinate with each other. Therefore, data can be exchanged and shared between vehicles of different vehicle manufacturers and between internet of vehicles application instances of different vehicle manufacturers.

An embodiment of the present invention provides an internet of vehicles message notification method, performed by a multi-access edge computing system, where the multi-access edge computing system includes a first application instance, a second application instance, and an interworking service instance, and the method includes:
  receiving, by the first application instance, a notification message;
  sending, by the first application instance, the notification message to the interworking service instance;
  sending, by the interworking service instance, the notification message to the second application instance that subscribes to the notification message; and
  sending, by the second application instance, the notification message to an in-vehicle application served by the second application instance.

An embodiment of the present invention provides an internet of vehicles message notification method, performed by a first multi-access edge computing system and a second multi-access edge computing system, where the first multi-access edge computing system includes a first application instance and a first interworking service instance, and the second multi-access edge computing system includes a second interworking service instance and a third application instance; and the method includes:
  receiving, by the first application instance, a notification message;
  sending, by the first application instance, the notification message to the first interworking service instance;
  sending, by the first interworking service instance, the notification message to the second interworking service instance;
  sending, by the second interworking service instance, the notification message to the third application instance that subscribes to the notification message; and
  sending, by the third application instance, the notification message to an in-vehicle application served by the third application instance.

An embodiment of the present invention further provides an internet of vehicles service notification method, performed by a first multi-access edge computing system, where the first multi-access edge computing system includes a first service discovery gateway and a first interworking service instance, and the method includes:
  receiving, by the first service discovery gateway, a service availability notification message from the first interworking service instance, where the service availability notification message includes address information of the available first interworking service instance; and
  sending, by the first service discovery gateway, the service availability notification message to a second service discovery gateway located in a second multi-access edge computing system.

An embodiment of the present invention further provides an internet of vehicles service discovery method, performed by a second multi-access edge computing system, where the second multi-access edge computing system includes a second service discovery gateway and a second interworking service instance, and the method includes:
  receiving, by the second service discovery gateway, a service availability notification message sent by a first service discovery gateway in a first multi-access edge computing system, where the service availability notification message includes address information of an available first interworking service instance in the first multi-access edge computing system;
  sending, by the second service discovery gateway, the address information to the second interworking service instance; and
  sending, by the second interworking service instance, a subscription request message to the first interworking service instance by using the address information.

An embodiment of the present invention provides a multi-access edge computing system, including a first application instance, a second application instance, and an interworking service instance, where
  the first application instance is configured to: receive a notification message and send the notification message to the interworking service instance;
  the interworking service instance is configured to send the notification message to the second application instance that subscribes to the message; and
  the second application instance is configured to send the notification message to an in-vehicle application served by the second application instance.

An embodiment of the present invention provides an multi-access edge computing system, including a first multi-access edge computing system and a second multi-access edge computing system, where the first multi-access edge computing system includes a first application instance and a first interworking service instance, and the second multi-access edge computing system includes a second interworking service instance and a third application instance, where
  the first application instance is configured to: receive a notification message and send the notification message to the first interworking service instance;
  the first interworking service instance is configured to send the notification message to the second interworking service instance;
  the second interworking service instance is configured to send the notification message to the third application instance that subscribes to the notification message; and
  the third application instance is configured to send the notification message to an in-vehicle application served by the third application instance.

An embodiment of the present invention provides a multi-access edge computing system, including a first service discovery gateway and a first interworking service instance, where
  the first service discovery gateway is configured to receive a service availability notification message from the first interworking service instance, where the service availability notification message includes address information of the available first interworking service instance; and
  the first service discovery gateway is configured to send the service availability notification message to a second service discovery gateway located in a second multi-access edge computing system.

An embodiment of the present invention provides a multi-access edge computing system, including a second service discovery gateway and a second interworking service instance, where the second service discovery gateway is configured to receive a service availability notification message sent by a first service discovery gateway in another multi-access edge computing system, where the service availability notification message includes address information of an available first interworking service instance in the other multi-access edge computing system;

the second service discovery gateway is configured to send the address information to the second interworking service instance; and the second interworking service instance is configured to send a subscription request message to the first interworking service instance by using the address information.

An embodiment of the present invention provides an apparatus, where the apparatus includes a processor and a memory, where the memory is configured to: store a program, that when executed by the processor, cause the processor to perform the steps in the foregoing method, and store data for implementing the steps in the foregoing method.

An embodiment of the present invention provides a computer-readable storage medium, where the computer-readable storage medium stores one or more executable program instructions, and when the one or more executable program instructions are run, the steps in the foregoing method are performed.

In the foregoing solutions, technical means, such as interconnection and interworking between an interworking service instance and application instances of different vehicle manufacturers, and service notification and discovery between service discovery gateways are used. This enables data to be exchanged and shared between vehicles of different vehicle manufacturers and between internet of vehicles application instances of different vehicle manufacturers. Therefore, a real internet of vehicles service is implemented.

DESCRIPTION OF EMBODIMENTS

To make the objectives, technical solutions, and advantages of this application clearer, the following further describes exemplary implementations of this application in detail with reference to the accompanying drawings.

Before the embodiments of this application are further described in detail, an internet of vehicles application scenario of the embodiments of this application is first described.

First, different internet of vehicles applications of vehicle manufacturers are deployed and installed on different MEC systems. Internet of vehicles applications of different vehicle manufacturers subscribe to a message from an interworking service instance in a MEC system.

An internet of vehicles application instance of a vehicle manufacturer receives, from a road condition device (for example, a vehicle served by the internet of vehicles application instance, or a road side unit (RSU), or another device that can detect information related to road conditions) or a related device of a traffic management department, a notification message that carries road condition information of a road section. Then, the internet of vehicles application instance may process information in the notification message, for example, anonymize privacy information such as an identifier of the vehicle X, and may send a processed notification message to the interworking service instance. The message indicates, by using a whitelist, that an application instance of a specific vehicle manufacturer can receive the message, and/or indicates, by using a blacklist, that an application instance of a specific vehicle manufacturer cannot receive the message. The road condition information includes related information such as a road traffic congestion degree, whether a road is smooth, whether an intersection is temporarily closed, whether a road is closed to traffic for repair, and vehicle-related emergency braking.

The interworking service instance sends the message to an internet of vehicles application instance of a corresponding vehicle manufacturer.

Internet of vehicles interworking service instances in different MEC systems may subscribe to a message from each other and publish a message to each other, to share information across the MEC systems. The following describes specific embodiments in detail.

Figure 2:
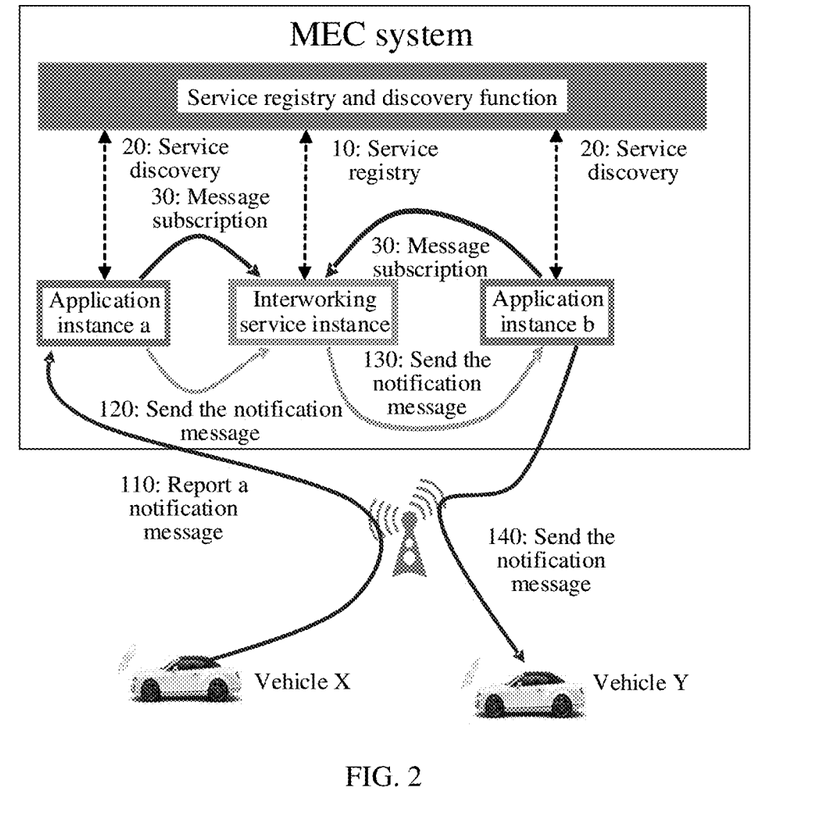
FIG. 2 is a schematic diagram of internet of vehicles notification message interaction in a MEC system according to an embodiment of the present invention.

Embodiment 1 relates to a method for message notification between different application instances in a same MEC system. As shown in FIG. 2, the different application instances may be deployed and installed by different vehicle manufacturers or a same vehicle manufacturer. The method includes the following steps.

110: An application instance a receives a notification message sent by an in-vehicle application of a vehicle X.

The application instance a is deployed on the MEC system by a vehicle manufacturer A. The in-vehicle application may detect related information of the vehicle X, road condition information of a road section along which the vehicle X moves, and the like. The notification message carries the related information of the vehicle X, the road condition information of the road section along which the vehicle X moves, and the like.

120: The application instance a sends the notification message to an interworking service instance.

The application instance a may process information of the received notification message, for example, anonymize privacy information such as an identifier of the vehicle X and may send a processed notification message to the interworking service instance. The sent message may indicate, by using a whitelist, that an application instance of a specific vehicle manufacturer can receive the message, and/or may indicate, by using a blacklist, that an application instance of a specific vehicle manufacturer cannot receive the message.

130: The interworking service instance sends the notification message to an application instance b that subscribes to the message.

The interworking service instance performs filtering on an application instance of a vehicle manufacturer based on a constraint condition in the message received in step 120, and sends the notification message to all application instances of the vehicle manufacturer that subscribe to the notification message and that satisfy the condition. In this embodiment, the application instance b is deployed and installed by another vehicle manufacturer B. The application instance a indicates that the application instance b can receive the notification message. In addition, the application instance b subscribes to the notification message.

140: The application instance b sends the notification message to an in-vehicle application served by the application instance b.

The application instance b that receives the notification message sends the message to an in-vehicle application of a vehicle Y (manufactured by the vehicle manufacturer B) in a same area. Before sending the message, the application instance b may process the message, for example, convert a format of the message into a format that can be identified by an in-vehicle application of a vehicle of the vehicle manufacturer B. (Note: Generally, a same format is used for vehicles manufactured by a same vehicle manufacturer.)

Because different internal protocols or data formats are used for application instances of different vehicle manufacturers in the prior art, interconnection and interworking between the application instances of the different vehicle manufacturers cannot be implemented. In this embodiment of the present invention, the foregoing technical means is used, to enable data to be exchanged and shared between vehicles of different vehicle manufacturers and between internet of vehicles application instances of the different vehicle manufacturers. Therefore, a real internet of vehicles service is implemented.

Before step 110, there is a procedure of deployment of the different application instances and the interworking service instance, registry of the interworking service instance, and subscription of the different application instances to a message from the interworking service instance. The procedure includes the following steps.

First, the different internet of vehicles application instances and the interworking service instance of the different vehicle manufacturers are deployed and installed on the MEC system. Then:

10: The interworking service instance registers with a service registry and discovery function in the MEC system.

20: Next, the different application instances a and b each sends a service discovery request to the service registry and discovery function in the MEC system, to request information of an internet of vehicles interworking service, where the request carries information of a geographical location. The service registry and discovery function responds with information of the interworking service instance in the geographic location area.

30: Finally, the application instances a and b of the vehicle manufacturers each sends a message subscription request to the interworking service instance, where the request may indicate subscription of a type of message or all messages.

Figure 3:
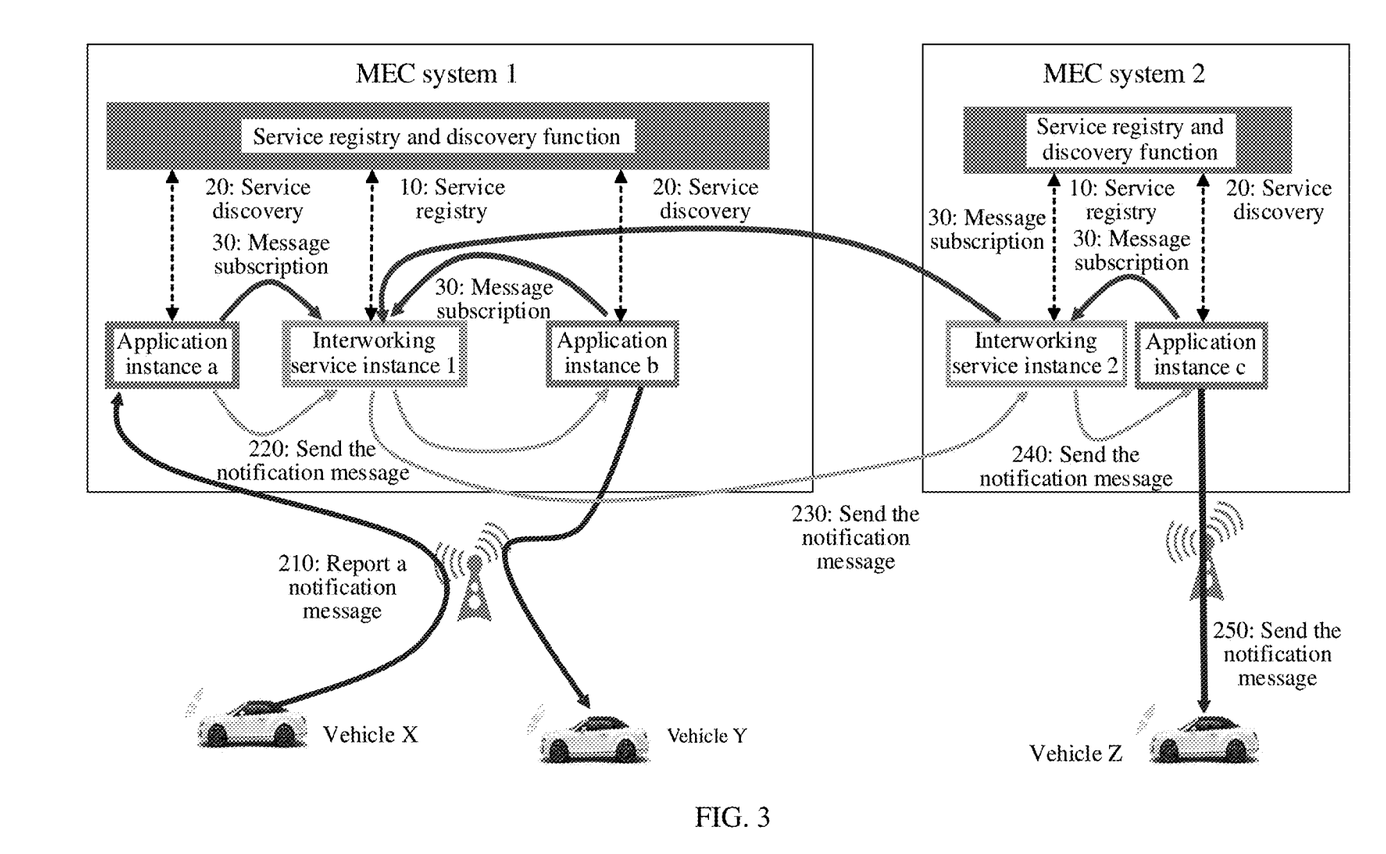
FIG. 3 is a schematic diagram of internet of vehicles notification message interaction between different MEC systems according to an embodiment of the present invention.

Embodiment 2 relates to a method for message notification between different application instances in different MEC systems (e.g., a MEC system 1 and a MEC system 2). As shown in FIG. 3, the different application instances may be deployed and installed by different vehicle manufacturers. The method includes the following steps.

210: An application instance a receives a notification message sent by an in-vehicle application of a vehicle X.

The application instance a is deployed on the MEC system 1 by a vehicle manufacturer A. The in-vehicle application may detect related information of the vehicle X, road condition information of a road section along which the vehicle X moves, and the like. The notification message carries the related information of the vehicle X, the road condition information of the road section along which the vehicle X moves, and the like.

220: The application instance a sends the notification message to an interworking service instance 1.

The application instance a may process information of the received notification message, for example, anonymize privacy information such as an identifier of the vehicle X, and may send a processed notification message to the interworking service instance 1. The sent message may indicate, by using a whitelist, that an application instance of a specific vehicle manufacturer can receive the message, and/or may indicate, by using a blacklist, that an application instance of a specific vehicle manufacturer cannot receive the message.

230: The interworking service instance 1 sends the notification message to an interworking service instance 2.

Because the different interworking service instances belong to different MEC systems, before step 210, the interworking service instances of the different MEC systems need to establish a connection by performing a service discovery procedure, to provide and invoke a corresponding service. For details, refer to the following related service discovery procedure. The interworking service instance 1 may send the notification message to the interworking service instance 2. In addition, the interworking service instance 1 may further send the notification message to another application instance that subscribes to the service in the MEC system 1, for example, an application instance b. A specific manner is the same as that in the step in Embodiment 1. Details are not repeated herein.

240: The interworking service instance 2 sends the notification message to an application instance c that subscribes to the notification message.

The interworking service instance 2 performs filtering on an application instance of a vehicle manufacturer based on a constraint condition in the message received in step 220, and sends the notification message to all application instances of the vehicle manufacturer that subscribe to the message and that satisfy the condition. In this embodiment, the application instance c is deployed and installed by another vehicle manufacturer C. The application instance a indicates that the application instance c can receive the notification message. In addition, the application instance c subscribes to the notification message.

250: The application instance c sends the notification message to an in-vehicle application served by the application instance c.

The application instance c that receives the notification message sends the message to an in-vehicle application of a vehicle Z (manufactured by the vehicle manufacturer C) in the same area. Before sending the message, the application instance c may process the message, for example, convert a format of the message into a format that can be identified by an in-vehicle application of a vehicle of the vehicle manufacturer C.

Figure 4:
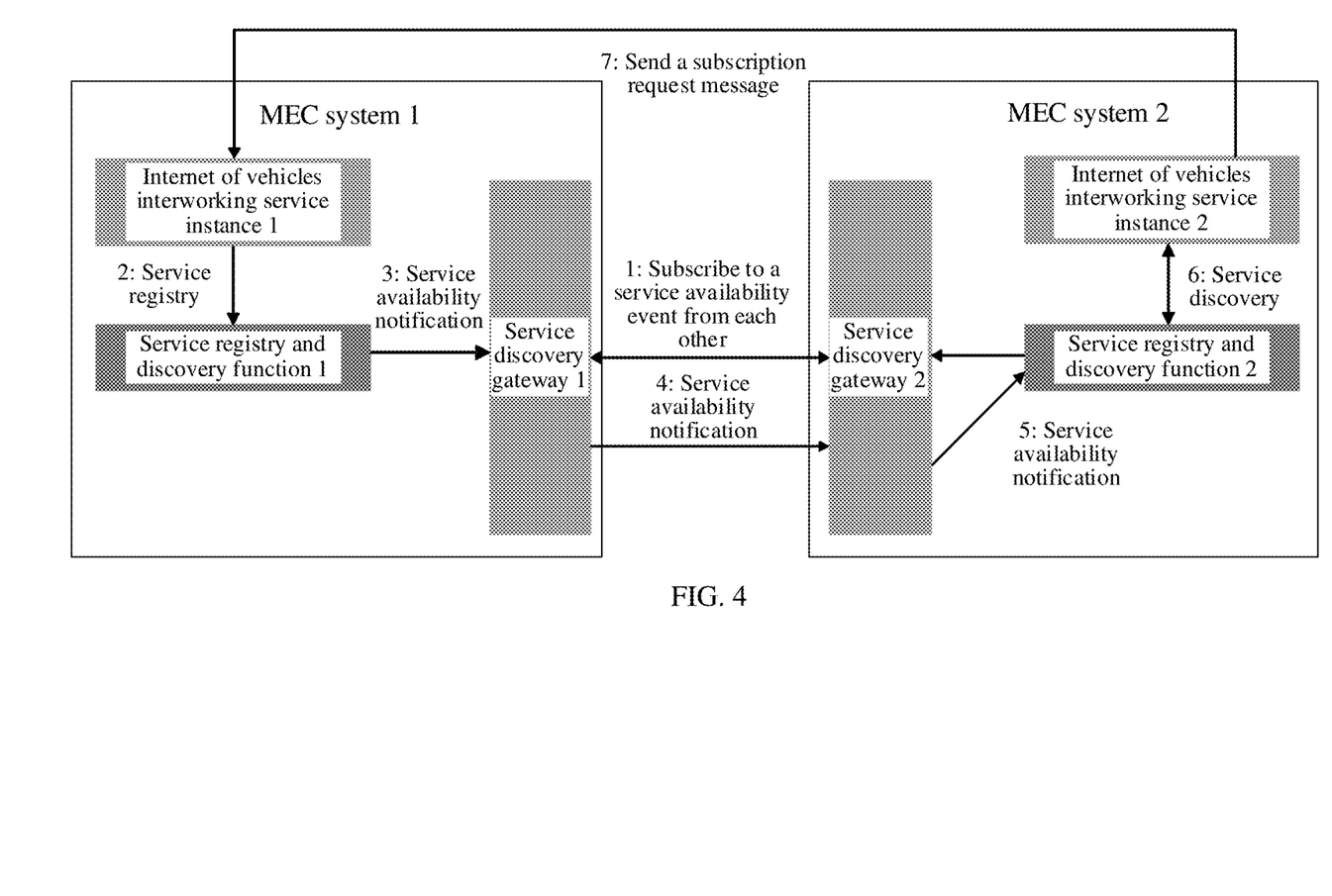
FIG. 4 is a schematic diagram of notification and discovery between different service discovery gateways in different MEC systems according to an embodiment of the present invention.

Steps 10, 20, and 30 in the procedure of deployment of the different application instances and the interworking service instance, registry of the interworking service instance, and subscription of the different application instances to a message from the interworking service instance in the MEC system are also applicable to the different application instances and the different interworking service instances in the different MEC systems in Embodiment 2. The procedure is performed before step 210. Same steps are not repeated herein. However, a difference lies in that an action of subscribing to a message from the interworking service instance 1 by the interworking service instance 2 is added to step 30 in Embodiment 2. A prerequisite for implementing this step is that instances or modules in the MEC system 1 and the MEC system 2 can notify and discover each other. Then, the instances or modules in the MEC system 1 and the MEC system 2 can obtain address information of each other, establish an interworking connection, and provide related services. As shown in FIG. 54, a specific service notification and discovery procedure is as follows.

1: The MEC systems 1 and 2 that need to interwork with each other subscribe to a service availability event from each other through service discovery gateways 1 and 2 respectively.

The service herein is a service that can be invoked by an application instance in another MEC system. In this embodiment, the service is an internet of vehicles interworking service. A service discovery gateway obtains information of a service discovery gateway in another MEC system, for example, an address and a port of the service discovery gateway. The service discovery gateway obtains the information in a configuration manner, from a MEC orchestrator of a local MEC system, or from a MEC orchestrator through a MEC platform manager in a local MEC system. A service discovery gateway that receives a subscription request may perform authentication on the request.

2: The interworking service instance 1 sends a service registry request message to a service registry and discovery function 1, where the message indicates that this service can be invoked by another MEC system.

In this step, the service registry request message may further carry an access token. The interworking service instance 1 uses the access token to perform authentication on a subsequent notification request message.

3: The service registry and discovery function 1 sends a service availability notification message to the service discovery gateway 1, where the message indicates that the interworking service instance 1 is available, and the message carries access address information of the interworking service instance 1 and may further carry the access token.

4: The service discovery gateway 1 sends the service availability notification message to the service discovery gateway 2.

5: The service discovery gateway 2 sends the service availability notification message to a service registry and discovery function 2, and the service registry and discovery function 2 stores the information of the interworking service instance 1.

Similarly, steps 2 to 5 are repeated for other interworking service instances, and the service registry and discovery function 2 stores information of the interworking service instances.

6: The interworking service instance 2 sends a service discovery request to the service registry and discovery function 2, and the service registry and discovery function 2 returns a response, where the response includes a list of internet of vehicles interworking service instances that are in a same location area as the service registry and discovery function 2, or the response further includes the access token, and the list of interworking service instances includes access address information of the interworking service instances. In Embodiment 2, the list of interworking service instances includes the access address information and location information that are of the interworking service instance 1.

7: The interworking service instance 2 subscribes to a service provided by the interworking service instance 1.

The interworking service instance 2 sends a subscription request message to the interworking service instance 1 based on the access address information and the location information that are of the interworking service instance 1. If the notification message in related steps 2 to 6 carries the token, the subscription request message carries the access token. The internet of vehicles interworking service instance 1 performs authentication on the notification request message based on the token. If authentication succeeds, it indicates that the interworking service instance 2 successfully subscribes to the service provided by the interworking service instance 1.

According to the foregoing procedure, different service registry and discovery functions in different MEC systems store information of interworking service instances in other MEC systems. A service registry and discovery function provides a list of interworking service instances in the other MEC systems and an access token for an interworking service instance in the local MEC system. In this way, connections are established between the different interworking service instances in the different MEC systems, and the different interworking service instances can provide a service to each other and subscribe to a service from each other. This ensures transmission of a subsequent notification message across MEC systems.

In the foregoing embodiments, technical means, such as interconnection and interworking between an interworking service instance and application instances of different vehicle manufacturers, and service notification and discovery performed by service discovery gateways are used. This enables data to be exchanged and shared between vehicles of different vehicle manufacturers and between internet of vehicles application instances of different vehicle manufacturers. Therefore, a real internet of vehicles service is implemented.

An embodiment of the present invention provides a multi-access edge computing system shown in FIG. 2, where the multi-access edge computing system may be configured to perform related steps in Embodiment 1. The multi-access edge computing system includes an application instance a, an application instance b, and an interworking service instance.

The application instance a is configured to: receive a notification message and send the notification message to the interworking service instance.

The interworking service instance is configured to send the notification message to the application instance b that subscribes to the message.

The application instance b is configured to send the notification message to an in-vehicle application served by the application instance b.

For other functions and execution actions of the application instance a, the application instance b, and the interworking service instance, refer to related steps in Embodiment 1. Details are not repeated herein.

An embodiment of the present invention provides a multi-access edge computing system as shown in FIG. 3, where the multi-access edge computing system may be configured to perform related steps in Embodiment 2. The multi-access edge computing system includes a multi-access edge computing system 1 and a multi-access edge computing system 2. The multi-access edge computing system 1 includes an application instance a and an interworking service instance 1, and the multi-access edge computing system 2 includes an interworking service instance 2 and an application instance c.

The application instance a is configured to: receive a notification message and send the notification message to the interworking service instance 1.

The interworking service instance 1 is configured to send the notification message to an interworking service instance 2.

The interworking service instance 2 is configured to send the notification message to the application instance c that subscribes to the notification message.

The application instance c is configured to send the notification message to an in-vehicle application served by the application instance c.

For other functions and execution actions of the application instance a, the application instance c, and the interworking service instances 1 and 2, refer to related steps in Embodiment 2. Details are not repeated herein.

An embodiment of the present invention provides a multi-access edge computing system 1 shown in FIG. 4, where the multi-access edge computing system 1 may be configured to perform related steps in the service notification and discovery procedure in Embodiment 2. The multi-access edge computing system 1 includes a service discovery gateway 1 and an interworking service instance 1.

The service discovery gateway 1 is configured to receive a service availability notification message from the interworking service instance 1, where the notification message includes address information of the available interworking service instance 1.

The service discovery gateway 1 is configured to send the service availability notification message to a service discovery gateway 2 located in a multi-access edge computing system 2 shown in FIG. 4.

The multi-access edge computing system 2 may be configured to perform related steps in the service notification and discovery procedure in Embodiment 2. The multi-access edge computing system 2 includes the service discovery gateway 2 and an interworking service instance 2.

The service discovery gateway 2 is configured to receive the service availability notification message sent by the service discovery gateway 1 in the multi-access edge computing system 1, where the notification message includes address information of an available interworking service instance 1 in the multi-access edge computing system 1.

The service discovery gateway 2 is configured to send the address information to the interworking service instance 2.

The interworking service instance 2 is configured to send a subscription request message to the interworking service instance 1 by using the address information.

Similarly, for other functions and execution actions of internal network elements in the multi-access edge computing system 1 and the multi-access edge computing system 2, refer to related steps of the method in Embodiment 2. Details are not repeated herein.

Figure 5:
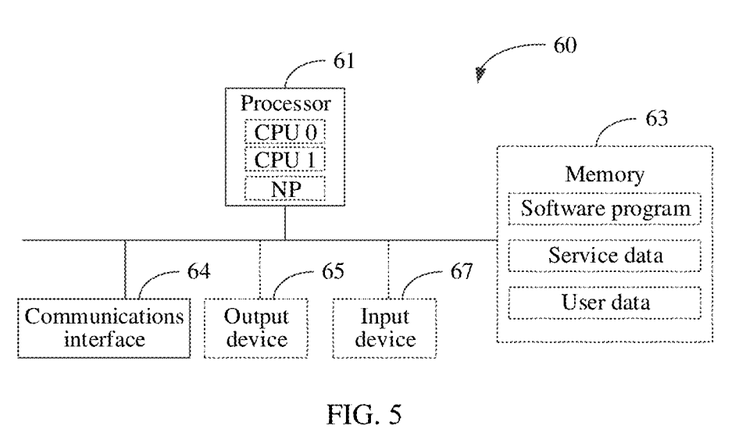
FIG. 5 is a hardware diagram of a MEC system according to an embodiment of the present invention.

FIG. 5 is a hardware diagram of a multi-access edge computing system 60 according to another embodiment of the present invention. The system 60 may include a processor 61, a communications interface 64, and a memory 63.

The processor 61 may include one or more processing units. Each of the processing one or more units may be a central processing unit (CPU), a network processor (English: network processor, NP), or the like.

The communications interface 64 is configured to connect to and exchange information with another communications device. Exchanging information includes receiving and sending a corresponding message. The system 60 may further include a memory 63. The processor 61 may be connected to the memory 63 and the communications interface 64 through a bus. The memory 63 may be configured to store a software program. The software program may be executed by the processor 61, to implement steps of the methods in the embodiments shown in FIG. 2, FIG. 3, and FIG. 4. In addition, the memory 63 may further store various types of service data or user data, including status data of various application instances and services in the steps of the foregoing methods, and the like.

Optionally, the network device 60 may further include an output device 65 and an input device 67. The output device 65 and the input device 67 are connected to the processor 61. The output device 65 may be a display configured to display information, a power amplifier device configured to play a sound, a printer, or the like. The output device 65 may further include an output controller, configured to provide an output to the display, the power amplifier device, or the printer. The input device 67 may be a device used by a user to input information, such as a mouse, a keyboard, an electronic stylus, or a touch panel. The input device 67 may further include an input controller, configured to receive and process an input from the device such as the mouse, the keyboard, the electronic stylus, or the touch panel.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit the protection scope, which is intended to cover any modification, equivalent replacement, or improvement determined by a person of ordinary skill in the art.

What is claimed is:

1. An internet of vehicles message notification method, performed by a first multi-access edge computing system and a second multi-access edge computing system, wherein the first multi-access edge computing system comprises a first application instance and a first interworking service instance, and the second multi-access edge computing system comprises a second interworking service instance and a third application instance, and the method comprises:

sending, by the first interworking service instance, a service availability notification message of the first interworking service instance to the second interworking service instance, wherein the service availability notification message comprises an access address of the first interworking service instance; and subscribing, by the second interworking service instance through the access address, to a service provided by the first interworking service instance;

receiving, by the first application instance, a notification message;

sending, by the first application instance, the notification message to the first interworking service instance;

sending, by the first interworking service instance, the notification message to the second interworking service instance;

sending, by the second interworking service instance, the notification message to the third application instance that subscribes to the notification message; and sending, by the third application instance, the notification message to an in-vehicle application served by the third application instance.

2. The method according to claim 1, wherein the first multi-access edge computing system further comprises a first service registry and discovery function and a first service discovery gateway, and the second multi-access edge computing system further comprises a second service registry and discovery function and a second service discovery gateway; and the method further comprises, before receiving, by the first application instance, the notification message:

subscribing, by the first service discovery gateway and the second service discovery gateway, to a service availability message from each other;

sending, by the first interworking service instance, the service availability notification message of the first interworking service instance, wherein the service availability notification message comprises address information of the first interworking service instance, and the service availability notification message sequentially passes through the first service registry and discovery function, the first service discovery gateway, the second service discovery gateway, and the second service registry and discovery function and reaches the second interworking service instance; and subscribing, by the second interworking service instance by using the address information, to the service provided by the first interworking service instance.

3. The method according to claim 1, wherein
the service availability notification message further comprises an access token, and the method further comprises:

sending, by the second interworking service instance, a subscription request to the first interworking service instance, the subscription request carrying the access token; and performing, by the first interworking service instance, authentication by using the access token, wherein when authentication succeeds, the second interworking service instance successfully subscribes to the service provided by the first interworking service instance.

4. The method according to claim 1, further comprising, before sending, by the third application instance, the notification message to the in-vehicle application served by the third application instance: converting, by the third application instance, a format of the notification message into a format that can be identified by the in-vehicle application served by the third application instance.

5. The method according to claim 1, wherein the first application instance and the third application instance belong to different vehicle manufacturers.

6. An internet of vehicles service notification method, performed by a first multi-access edge computing system including a first service discovery gateway and a first interworking service instance, comprising:

receiving, by the first service discovery gateway, a service availability notification message from the first interworking service instance, wherein the service availability notification message comprises address information of the available first interworking service instance; and sending, by the first service discovery gateway, the service availability notification message to a second service discovery gateway located in a second multi-access edge computing system.

7. The method according to claim 6, wherein the first multi-access edge computing system further comprises a first service registry and discovery function, and receiving the service availability notification message from the first interworking service instance comprises:

sending, by the first interworking service instance, a service registry request message to the first service registry and discovery function, wherein the request message indicates that a service provided by the first interworking service instance can be invoked by another multi-access edge computing system; and sending, by the first service registry and discovery function, the service availability notification message to the first service discovery gateway.

8. The method according to claim 6, wherein the service availability notification message comprises an access token.

9. A communication system, comprising a first multi-access edge computing system and a second multi-access edge computing system, wherein the first multi-access edge computing system comprises a first application instance and a first interworking service instance, and the second multi-access edge computing system comprises a second interworking service instance and a third application instance, and wherein the first multi-access edge computing system comprises at least one first memory and at least one first processor, wherein the at least one first memory stores first instructions that, when executed by the at least one first processor, cause the first interworking service instance to:

send a service availability notification message of the first interworking service instance to the second interworking service instance, wherein the service availability notification message comprises an access address of the first interworking service instance; and wherein the second multi-access edge computing system comprises at least one second memory and at least one second processor, wherein the at least one second memory stores second instructions that, when executed by the at least one second processor, cause the second interworking service instance to:

subscribe through the access address, to a service provided by the first interworking service instance;

the first instructions, when executed by the at least one first processor, further cause the first application instance to:

receive a notification message;

send the notification message to the first interworking service instance;

the first instructions, when executed by the at least one first processor, further cause the first interworking service instance to:

send the notification message to the second interworking service instance;

the second instructions, when executed by the at least one second processor, further causes the second interworking service instance to:

send the notification message to the third application instance that subscribes to the notification message; and the second instructions, when executed by the at least one second processor, further cause the third application instance to:

send the notification message to an in-vehicle application served by the third application instance.

10. The communication system according to claim 9, wherein the first multi-access edge computing system further comprises a first service registry and discovery function and a first service discovery gateway, and the second multi-access edge computing system further comprises a second service registry and discovery function and a second service discovery gateway; and the first service discovery gateway and the second service discovery gateway are configured to: before the first application instance receives the notification message, subscribe to the service availability notification message from each other;

wherein the service availability notification message comprises address information of the first interworking service instance, and the service availability notification message sequentially passes through the first service registry and discovery function, the first service discovery gateway, the second service discovery gateway, and the second service registry and discovery function and reaches the second interworking service instance.

11. The communication system according to claim 9, wherein the service availability notification message further comprises an access token;

the second instructions, when executed by the at least one second processor, further cause the second interworking service instance to send a subscription request to the first interworking service instance, the subscription request carrying the access token; and the first instructions, when executed by the at least one first processor, further cause the first interworking service instance to perform authentication by using the access token, wherein when authentication succeeds, the second interworking service instance successfully subscribes to the service provided by the first interworking service instance.

12. The communication system according to claim 9, wherein the second instructions, when executed by the at least one second processor, further cause the third application instance to:

before sending the notification message to the in-vehicle application served by the third application instance, convert a format of the notification message into a format that can be identified by the in-vehicle application served by the third application instance.

13. The communication system according to claim 9, wherein the first application instance and the third application instance belong to different vehicle manufacturers.

* * * * *

UNITED STATES PATENT AND TRADEMARK OFFICE
CERTIFICATE OF CORRECTION

PATENT NO. : 12,101,700 B2
APPLICATION NO. : 17/320699
DATED : September 24, 2024
INVENTOR(S) : Jiangping Feng It is certified that error appears in the above-identified patent and that said Letters Patent is hereby corrected as shown below:

In the Specification

Column 9, Line 8, change "Fig. 54" to --Fig. 4--.

Signed and Sealed this
Twenty-second Day of October, 2024

Katherine Kelly Vidal
*Director of the United States Patent and Trademark Office*